US012659191B2

(12) United States Patent
Hebron et al.

(10) Patent No.: US 12,659,191 B2
(45) Date of Patent: Jun. 16, 2026

(54) CHANNEL CALIBRATION IN HIGH DENSITY ANTENNA SYSTEMS

(71) Applicant: Cohere Technologies, Inc., San Jose, CA (US)

(72) Inventors: Yoav Hebron, San Jose, CA (US); Shlomo Selim Rakib, San Jose, CA (US); Shachar Kons, San Jose, CA (US)

(73) Assignee: Cohere Technologies, Inc., San Jose, CA (US)

( * ) Notice: Subject to any disclaimer, the term of this patent is extended or adjusted under 35 U.S.C. 154(b) by 24 days.

(21) Appl. No.: 18/847,648

(22) PCT Filed: Mar. 21, 2023

(86) PCT No.: PCT/US2023/064773
§ 371 (c)(1),
(2) Date: Sep. 16, 2024

(87) PCT Pub. No.: WO2023/183809
PCT Pub. Date: Sep. 28, 2023

(65) Prior Publication Data
US 2025/0202732 A1      Jun. 19, 2025

Related U.S. Application Data

(60) Provisional application No. 63/269,706, filed on Mar. 21, 2022.

(51) Int. Cl.
H04L 25/02          (2006.01)
H04L 5/00           (2006.01)
H04L 5/14           (2006.01)

(52) U.S. Cl.
CPC ........ H04L 25/0202 (2013.01); H04L 5/0048 (2013.01); H04L 5/14 (2013.01)

(58) Field of Classification Search
CPC ..... H04L 25/0202; H04L 5/0048; H04L 5/14; H04B 7/0604; H04B 7/10; H04B 1/40
See application file for complete search history.

(56) References Cited

U.S. PATENT DOCUMENTS

2017/0070276 A1      3/2017  Kim et al.
2018/0083745 A1      3/2018  Sun et al.
(Continued)

FOREIGN PATENT DOCUMENTS

EP          3780527 B1  * 10/2025    ......... H04L 25/0212
WO        2021/147613        7/2021
WO        2022/037076        2/2022

OTHER PUBLICATIONS

Partial Search Report for co-pending EP Appl. No. 23775849.5, dated May 20, 2025, 17 pages.
(Continued)

*Primary Examiner* — Jean B Corrielus
(74) *Attorney, Agent, or Firm* — Perkins Coie LLP

(57)          ABSTRACT
Methods, systems and devices for wireless communication are described. An example method for wireless communication includes controlling a sweep of channel estimation transmissions across a two-dimensional antenna array comprising N horizontal antennas and M vertical antennas according to an operational condition in a wireless communication network. In one example, a pattern used for the sweep sweeps across horizontal antennas followed by a sweep across vertical antennas. In another example, a pattern used for the sweep sweeps across vertical antennas followed by a sweep across horizontal antennas.

18 Claims, 12 Drawing Sheets

Determining, by a transmitting device configured with N horizontal antennas and M vertical antennas, a sequence of channel estimation signal transmissions ⌇⌇ 1202

Performing, according to the sequence, transmissions of the channel estimation signal transmissions ⌇⌇ 1204

(56)          References Cited

U.S. PATENT DOCUMENTS

| | | |
|---|---|---|
| 2019/0182716 A1 | 6/2019 | Futaki et al. |
| 2020/0112355 A1 | 4/2020 | Park et al. |
| 2021/0098000 A1 | 4/2021 | Tanoguchi et al. |
| 2023/0268668 A1* | 8/2023 | Pefkianakis ........... H01Q 21/24 |
| | | 343/700 R |

OTHER PUBLICATIONS

Extended European Search Report for co-pending EP Appl. No. 23775849.5, dated Aug. 11, 2025, 15 pages.

International Search Report and Written Opinion for PCT/US2023/064773, dated Aug. 17, 2023, 20 pages.

* cited by examiner

| TDD/FDD | BW [MHz] | Antenna Config | SRS Throughput ($Th_{SRS}$) | F1 DL Throughput ($Th_{F1,DL}$) | F1 UL Throughput ($Th_{F1,UL}$) | SRS Overhead ($O_{F1,SRS}$) [%] | Total UL/ Total DL* |
|---|---|---|---|---|---|---|---|
| FDD (LTE) | 20 | 4Tx4R | 23.0 Mbps | 390 Mbps | 246 Mbps | 7.9% | 0.69 |
| TDD (NR) | 100 | 64Tx64R | 251.6 Mbps | 8.1 Gbps | 1.9 Gbps | 5.9% | 0.27 |

Determining, by a transmitting device configured with N horizontal antennas and M vertical antennas, a sequence of channel estimation signal transmissions ~1202

Performing, according to the sequence, transmissions of the channel estimation signal transmissions ~1204

1200

CHANNEL CALIBRATION IN HIGH DENSITY ANTENNA SYSTEMS

This application is a 371 National Phase Application of PCT Application No. PCT/US2023/064773 entitled "CHANNEL CALIBRATION IN HIGH DENSITY ANTENNA SYSTEMS" filed on Mar. 21, 2023, which claims priority to U.S. Patent Application No. 63/269,706, filed on Mar. 21, 2022, the disclosure of which is hereby incorporated by reference herein in its entirety.

TECHNICAL FIELD

The present document relates to wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques that may be used by wireless networks to achieve several operational improvements.

In one example aspect, a method of performing channel estimation reference signal transmissions in a manner that reduces amount of data transmissions over an open interface between two end points, e.g., an E2 interface between distributed units (DUs) and centralized units (CUs) in nodes in Fifth Generation (5G) networks or an open radio access network (O-RAN) compliant eNodeB in 4G networks.

In another example aspect, a method of performing channel estimation reference signal transmissions includes sweeping horizontally across antennas in a two-dimensional array that is stepped vertically through antenna rows. In another example aspect, the sweeping pattern is determined based on operating conditions in the wireless network.

In yet another example aspect, a method of wireless communication includes performing reference signal transmissions from an antenna array using a pattern that is determined based on an expected horizontal or vertical movement speed of receiving devices.

In yet another example aspect, the method may be embodied as processor-executable code and may be stored on a computer-readable program medium.

In yet another aspect, a wireless communication system that operates by providing a single pilot tone for channel estimation is disclosed.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only. Furthermore, certain standard-specific terms are used for illustrative purpose only, and the disclosed techniques are applicable to any wireless communication systems.

1. Introduction—Wireless Communication Environment

The wireless or time-variant nature of the communication channel poses several challenges in design a transmission protocol suitable for wireless communication scenarios. These days, users expect their wireless devices to work everywhere and in a variety of mobile or stationary situations. A wireless communication environment may include receiving devices (user equipment UE or user devices) that exhibit horizontal and/or vertical movement relative to the transmitting device (e.g., a base station).

2. Example Wireless Systems

Figure 1:
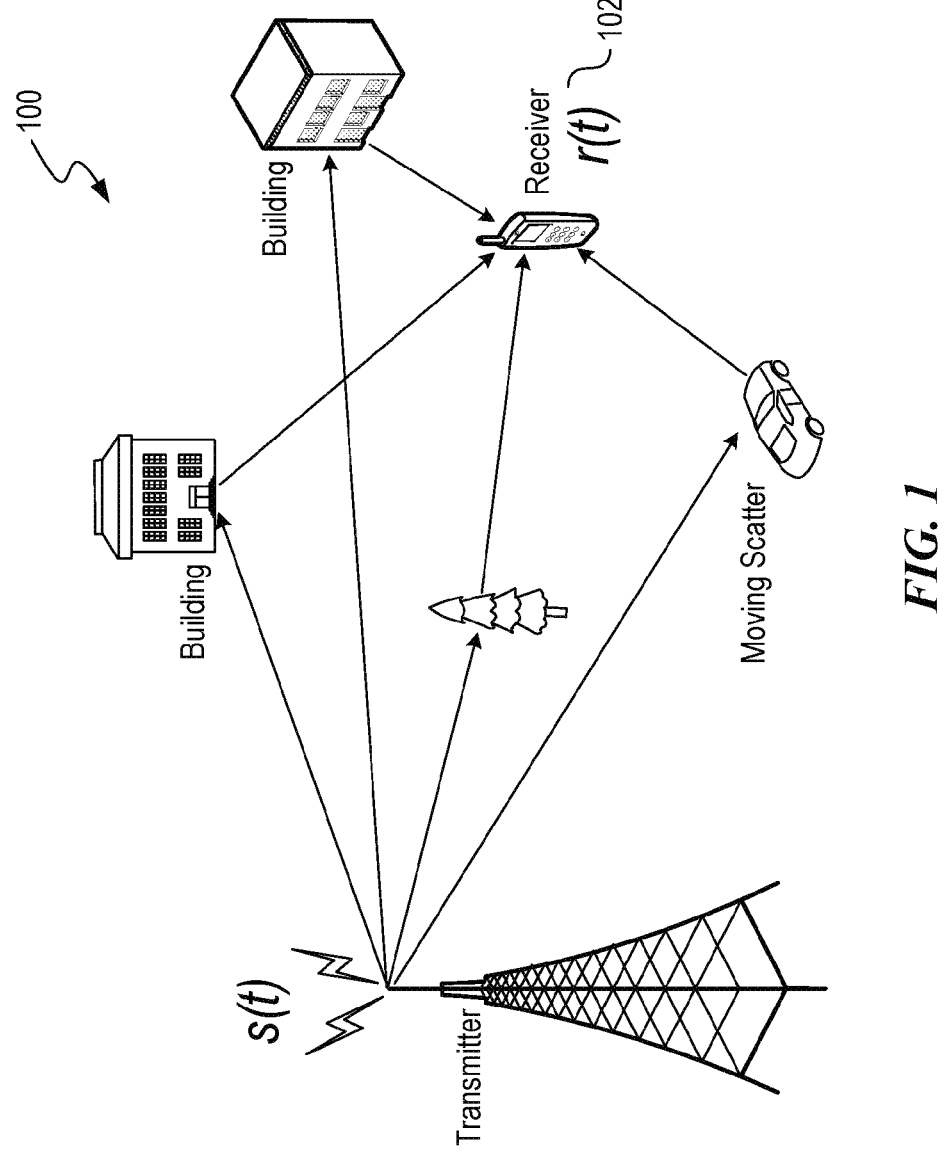
FIG. 1 shows an example communication network.

FIG. 1 shows an example of a wireless communication system 100 in which a transmitter device 102 transmits signals to a receiver 104. The signals may undergo various wireless channels and multipaths, as depicted. Some reflectors such as buildings and trees may be static, while others such as cars, may be moving scatterers. The transmitter device 102 may be, for example, a user device, a mobile phone, a tablet, a computer, or another Internet of Things (IoT) device such as a smartwatch, a camera, and so on. The receiver device 104 may be a network device such as the base station. The signals transmitted from the base station to the transmitter 102 may experience similar channel degradations produced by static or moving scatterers. The techniques described in the present document may be implemented by the devices in the wireless communication system 100. The terms "transmitter" and "receiver" are simply used for convenience of explanation and, as further described herein, depending on the direction of transmission (uplink or downlink), the network station may be transmitting or receiving and user device may be receiving or transmitting.

Figure 2:
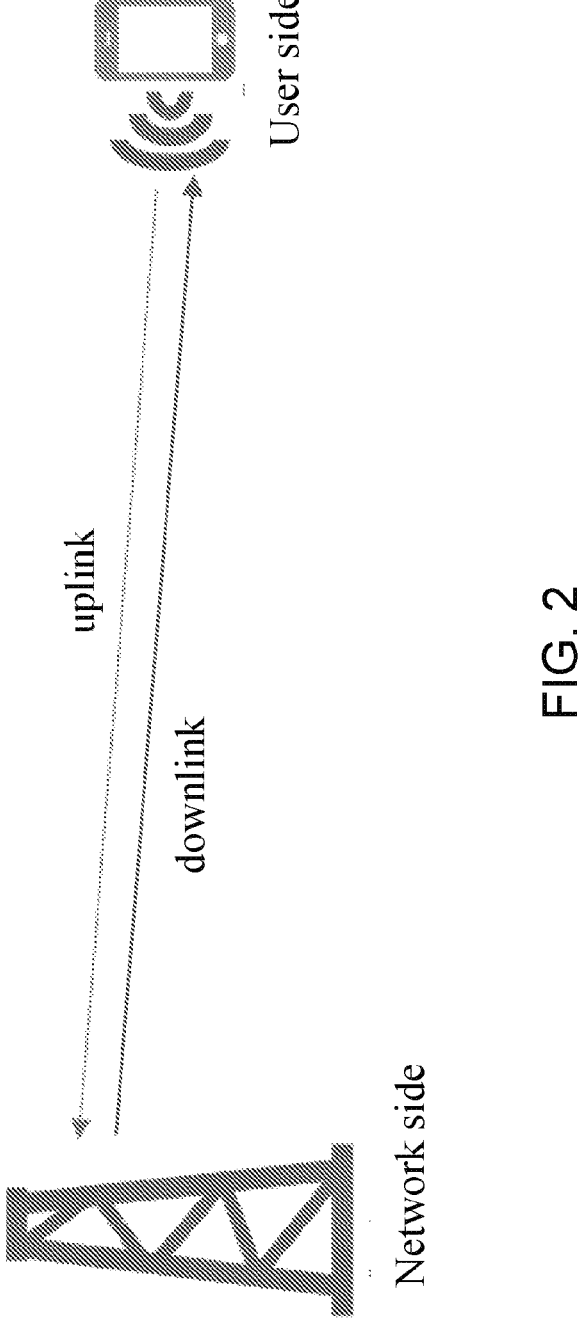
FIG. 2 shows a simplified example of a wireless communication system in which uplink and downlink transmissions are performed.

FIG. 2 shows a simplified wireless network to highlight certain aspects of the disclosed technology. A transmitter transmits wireless signals to a receiver in the wireless network. Some transmissions in the network, variously called as downlink or downstream transmissions, a network-side node such as a base station acts as a transmitter of wireless signals and one or more user devices act as the receiver of these wireless signals. For some other transmissions, as depicted in FIG. 2, the direction of transmission may reversed. Such transmissions are often called uplink or upstream transmissions. For such transmissions, one or more user devices act as transmitters of the wireless signals and a network-side node such as the base station acts as the receiver of these signals (as depicted in FIG. 2). Other type of transmissions in the network may include device-to-device transmissions, sometimes called direct or sideband transmissions. While the present document primarily uses the terms "downlink" and "uplink" for the sake of convenience, similar techniques may also be used for other situations in which transmissions in two directions are performed—e.g., inbound or incoming transmissions that are received by a wireless device and outbound or outgoing transmissions that are transmitted by a wireless device. For example, downlink transmissions may be inbound transmissions for a user device, while outbound transmissions for a network device. Similarly, uplink transmission may be inbound transmissions for a network device while outbound transmissions from a wireless device. Therefore, for some embodiments, the disclosed techniques may also be described using terms such as "inbound" and "outbound" transmission without importing any 3GPP-specific or other wireless protocol-specific meaning to the terms "uplink" and "downlink."

In frequency division multiplexing (FDM) networks, the transmissions to a base station and the transmissions from the base station may occupy different frequency bands (each of which may occupy continuous or discontinuous spectrum). In time division multiplexing (TDM) networks, the transmissions to a base station and the transmissions from the base station occupy a same frequency band but are separated in time domain using a TDM mechanism such as time slot based transmissions. Other types of multiplexing are also possible (e.g., code division multiplexing, orthogonal time frequency space, or OTFS, multiplexing, spatial multiplexing, etc.). In general, the various multiplexing schemes can be combined with each other. For example, in spatially multiplexed systems, transmissions to and from two different user devices may be isolated from each other using directional or orientational difference between the two end points (e.g., user devices and a network station such as a base station).

3. Examples of Reducing SRS Throughput Over an E2 Interface

Figures 3A, 3B, 3C:
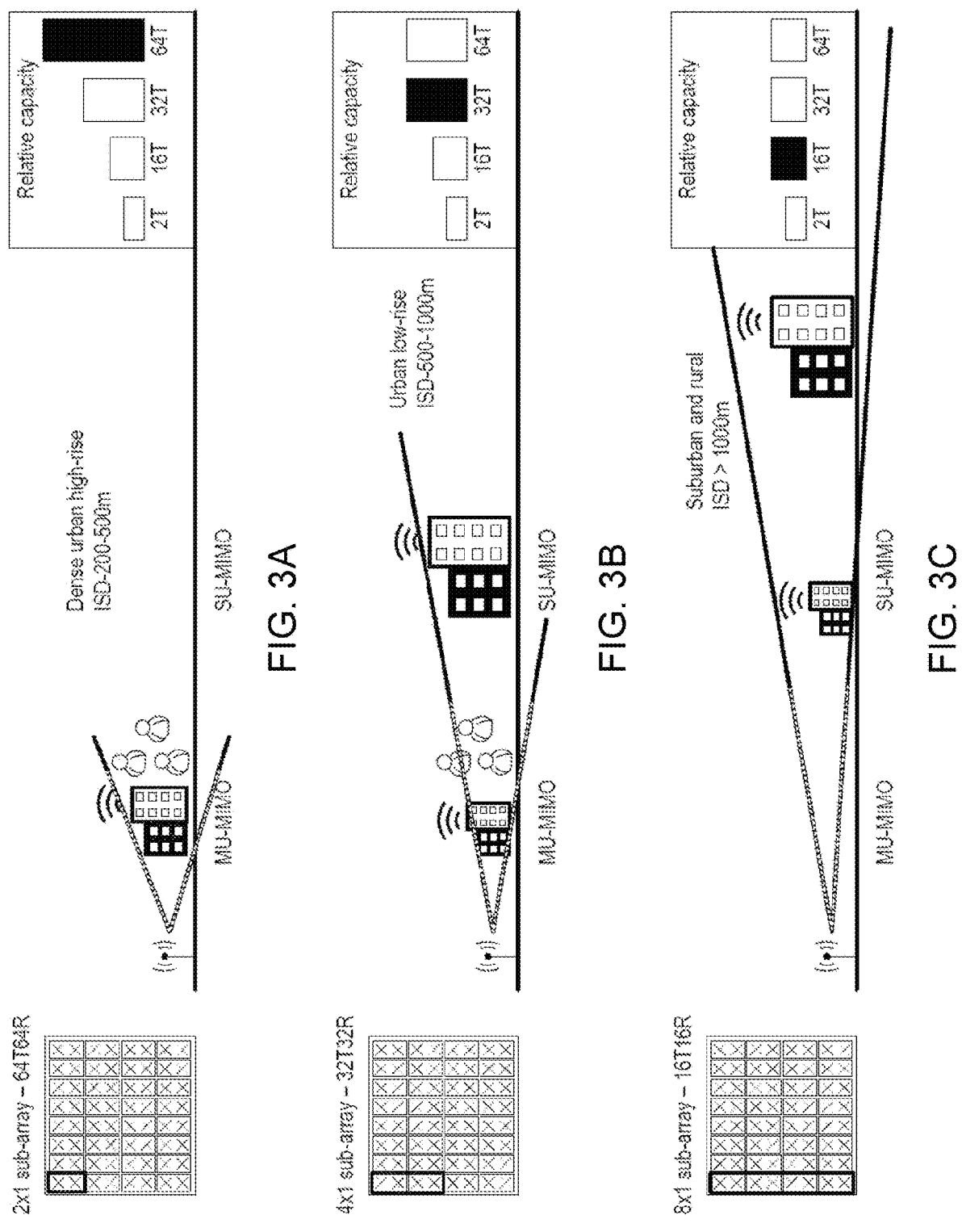
FIGS. 3A-3C show various example configurations of an 8×8 antenna array.

One example reference signal that may be used for channel estimation is the sounding reference signal (SRS). SRS samples may be used to form MU-MIMO (multi-user multiple-input multiple-output) beams using an xAPP in the Near-RT (real time) RIC (radio access network intelligent controller). Sending SRS samples from all received antenna ports is the brute-force way and may result in very high throughput when using a large antenna array. Examples of an 8×8 antenna array with different configurations are shown in FIGS. 3A-3C.

In some embodiments, the SRS throughput can be computed as:

$$\text{Throughput}_{SRS} = \frac{N_{SRS\_bits} \times N_{SRS\_sym} \times N_{RE/Sym} \times N_{layers}}{T_{SRS}}$$

Herein, $N_{SRS\_bits}$ and $N_{SRS\_sym}$ are the number of bits and number of symbols in the SRS, respectively, $T_{SRS}$ is the duration of the SRS, $N_{RE/Sym}$ is the number of resource elements per symbol, and $N_{layers}$ is the number of layers.

Herein, the throughput of the packet data converge protocol (PDCP) radio link protocol (RLP) is calculated based on the bandwidth, the numerology, the number of layers, the highest modulation and coding scheme (MCS), the demodulation reference signal (DMRS), radio link control (RLC) and medium access control (MAC) overheads, and assuming no SRS.

The following are examples of how the SRS throughput requirements can be lowered over the E2 interface (e.g., an interface that carriers channel condition information between centralized unit (CU) and distributed unit (DU)).

In the configuration shown in FIG. 3A that supports 64 transmit and 64 receive antenna elements (denoted 64T64R), one can cycle through the 4 (or in two groups of 2) elevation beams (rows) instead of sending all 64 SRS samples each time the SRS is sent in the UL. Then, one can cycle through the 8 (or 4 groups of 2, or 2 groups of 4) azimuth beams (8 columns). FIGS. 3B and 3C show configurations supporting 32T32R and 16T16R, respectively.

Figures 4A, 4B:
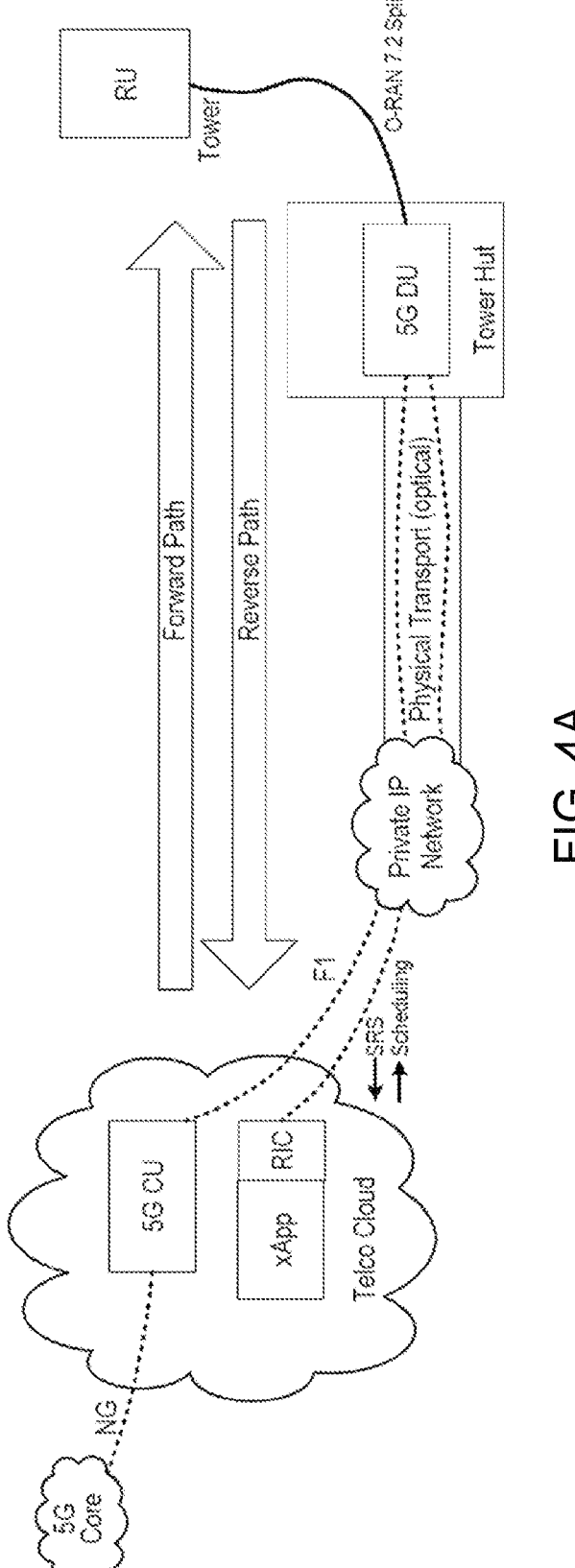
FIG. 4A shows an example of a communication system in which the disclosed techniques are implemented.
FIG. 4B shows example throughputs/overheads for the 8×8 antenna array configuration.

FIG. 4A shows an example of a system in which the disclosed techniques may be implemented. As shown therein, the DU is connected to the cloud using a fiber link which carries both data and control, and the F1-u, F1-c, E2 links are separated in the cloud where link throughput is not an issue. For example, all E2 information from the DU to the RIC gets added to the uplink F1 data. It is further assumed that the fiber link is full duplex and needs to support the maximum potential downlink data. Thus, the throughput (TH) requirement on the fiber link will increase only when the total uplink data plus control gets higher than that of the downlink.

FIG. 4B shows example throughputs and overheads for two scenarios:

Ex1 is an LTE system with frequency-division duplexing (FDD), a 20 MHz bandwidth, supporting 4T4R, 15 KHz subcarrier spacing (SCS), and 1 SRS symbol per 5 msec. Using FDD corresponds to the SRS being sent on every fifth transmission, which results in the total uplink throughput being data×(4+13/14)/5 plus the SRS transmissions. Herein, the SRS overhead can be computed as.

$$FDD: OH_{SRS} \cong \frac{TH_{F1_{UL}} \frac{4+13/14}{5} + TH_{SRS}}{TH_{F1_{UL}}} - 1$$

Ex2 is an NR system with time-division duplexing (TDD), a 100 MHZ bandwidth, supporting 64T64R, 30 KHz SCS, 20% UL/DL ratio, and 1 SRS symbol per 5 msec, e.g., as shown in FIG. 3A. Using TDD with the 20% UL/DL ratio corresponds to the data and the SRS are sent at the same rate, which results in the total uplink throughput being data×13/14 plus the SRS transmissions. Herein, the SRS overhead can be computed as:

$$TDD: OH_{SRS} \cong \frac{TH_{F1_{UL}} \frac{13}{14} + TH_{SRS}}{TH_{F1_{UL}}} - 1$$

In FIG. 4B, a value of less than 1.0 in the last column indicates that adding the SRS does not change the fiber throughput requirements.

In some embodiments, the SRS samples can be compressed using known compression algorithms that will result in low enough loss to minimize the impact on the signal-to-interference and noise ratio (SINR) of the SRS. In other embodiments, the SRS samples can be cycled through in both horizontal and vertical directions.

4. Examples of Industry Group Wireless Communication System Frameworks

Recent releases of 3GPP identify three distinct gNodeB functions: centralized unit (CU), distributed unit (DU), and radio unit (RU). There are several ways to configure these three components, and deciding which configuration is best depends on each individual network. The O-RAN architecture is based on well-defined, standardized interfaces to enable an open, interoperable supply chain ecosystem in full support of and complimentary to standards promoted by 3GPP and other industry standards organizations.

Figure 5:
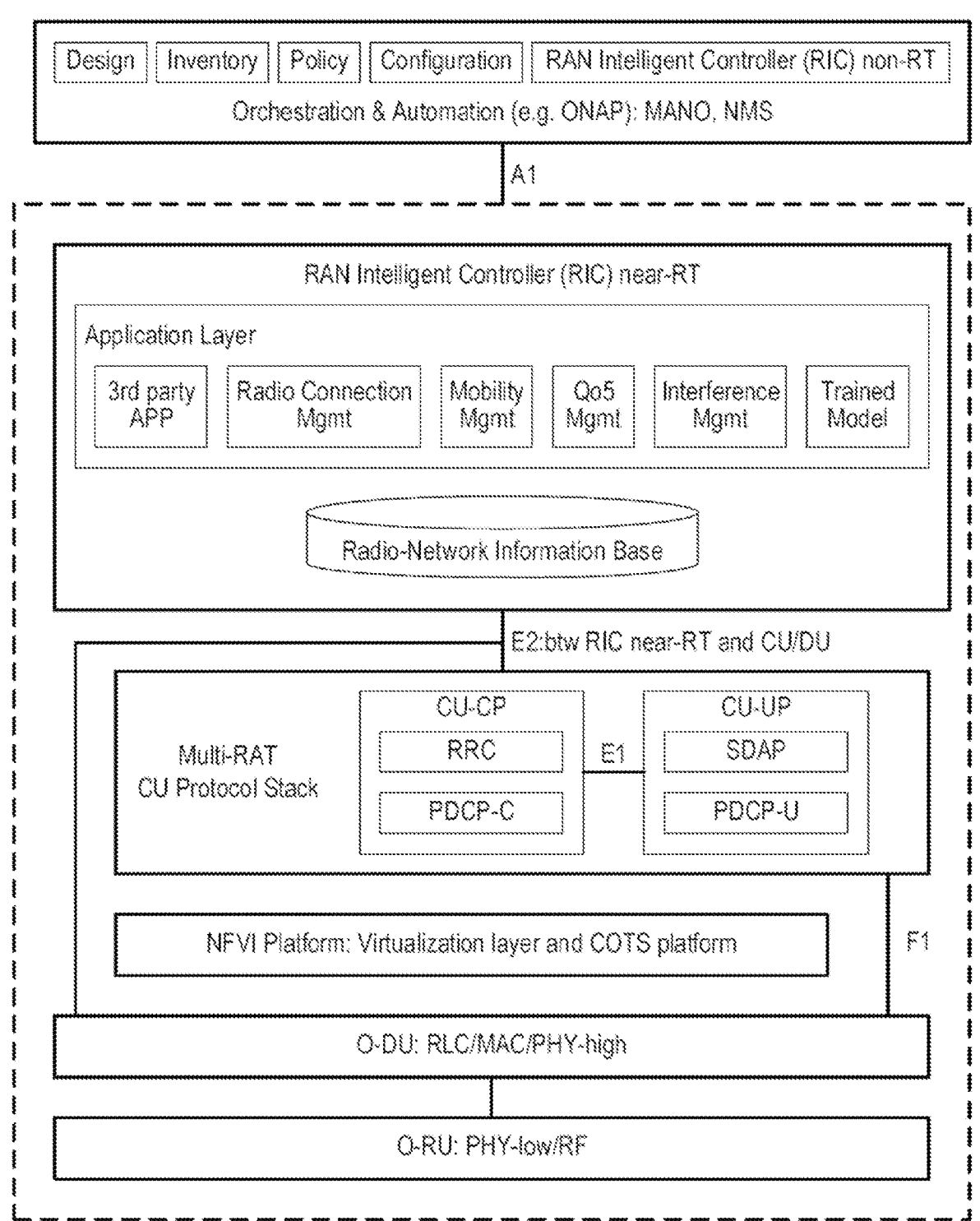
FIG. 5 shows an example of a wireless communication system architecture in which the disclosed techniques are implemented.

FIG. 5 depicts an example of a network architecture in which the techniques described here in can be implemented. In particular, the E2 interface traffic may be alleviated using the disclosed techniques. As shown in FIG. 5, the O-RAN architecture includes the following salient features and functional modules:

RAN Intelligent Controller (RIC) non-Real Time (non-RT) layer. Non-RT control functionality (>1s) and near-Real Time (near-RT) control functions (<1s) are decoupled in the RIC. Non-RT functions include service and policy management, RAN analytics and model-training for the near-RT RAN functionality. Trained models and real-time control functions produced in the RIC non-RT are distributed to the RIC near-RT for runtime execution.

RAN Intelligent Controller (RIC) near-Real Time (near-RT) layer. RIC near-RT is completely compatible with legacy RRM and begins by enhancing well understood, but operational challenging functions such as per-UE controlled load-balancing, RB management, interference detection and mitigation. In addition, it provides new functions leveraging embedded intelligence, such as QoS management, connectivity management and seamless handover control. The RIC near-RT delivers a robust, secure, and scalable platform that allows for flexible on-boarding of third-party control-applications. RIC near-RT functions leverages a database called the Radio-Network Information Base (R-NIB) which captures the near real-time state of the underlying network via E2 and commands from RIC non-RT via A1.

Herein, E2 is the interface between the RIC near-RT and the Multi-RAT CU protocol stack and the underlying RAN DU. Originated from the interface between legacy RRM and RRC in traditional systems, the E2 delivers a standard interface between the RIC near-RT and CU/DU in the context of an O-RAN architecture. While the E2 interface feeds data, including various RAN measurements, to the RIC near-RT to facilitate radio resource management, it is also the interface through which the RIC near-RT may initiate configuration commands directly to CU/DU.

Multi-RAT CU protocol stack and platform. The function of the Multi-RAT protocol stack supports 4G, 5G and other protocol processing. The basic functions of the protocol stack are implemented according to the control commands issued by the RIC near-RT module (for example: handovers). Virtualization delivers a highly efficient execution environment for CU and RIC near-RT, providing the ability to distribute capacity across multiple network elements with security isolation, virtual resource allocation, accelerator resource encapsulation, among other benefits.

DU and RRU Functions. The DU and RRU function includes real-time L2 functions, baseband processing and radio frequency processing.

Figure 6:
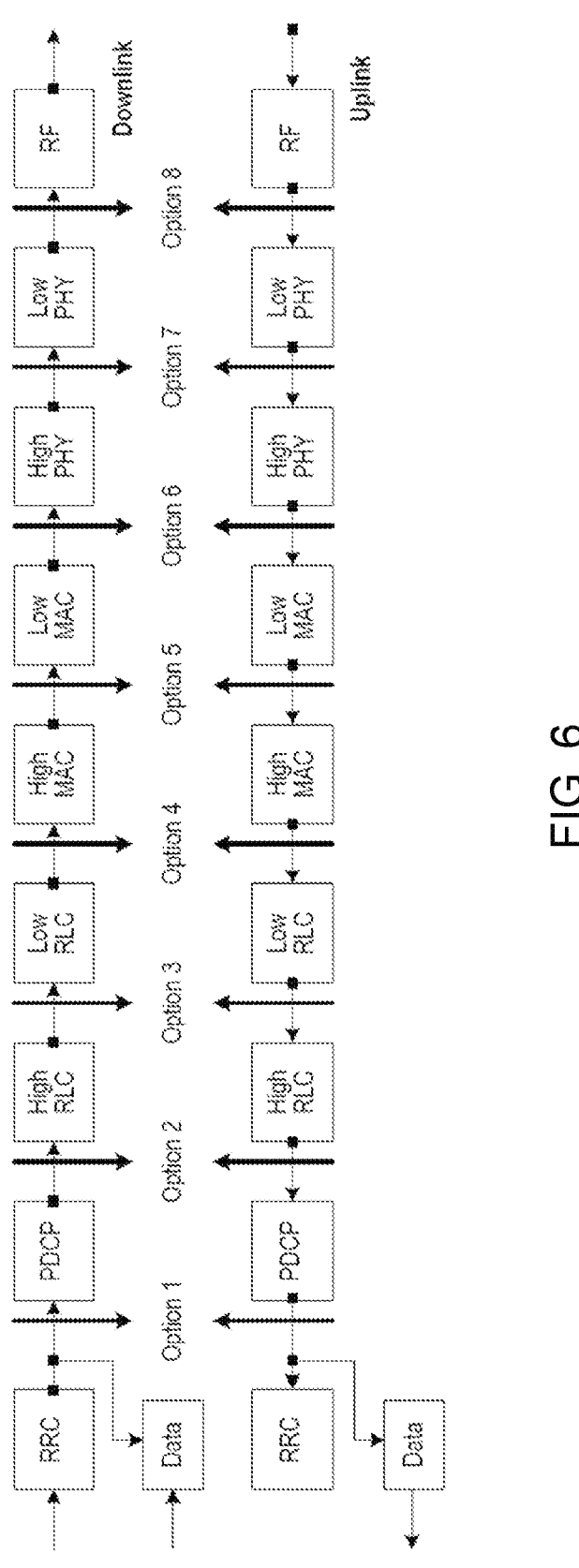
FIG. 6 shows examples of split options in the system architecture of FIG. 5.

The O-RAN architecture uses a split-RAN concept. There are eight known ways to functionally split the RAN, and each one proposes splitting the processing so that different parts of the protocol stack process on different hardware. FIG. 6 summarizes the eight options.

In some embodiments, the O-RAN uses option 7-2 which, as shown in FIG. 6, splits the physical layer (PHY) into a high-PHY and a low-PHY. For option 7-2, the uplink (UL), CP removal, fast Fourier transform (FFT), digital beamforming (if applicable), and prefiltering (for PRACH (Physical Random Access Channel) only) functions all occur in the RU. The rest of the PHY is processed in the DU. For the downlink (DL), the inverse FFT (iFFT), CP addition, precoding functions, and digital beamforming (if applicable) occur in the RU, and the rest of the PHY processing happens in the DU.

Figure 7:
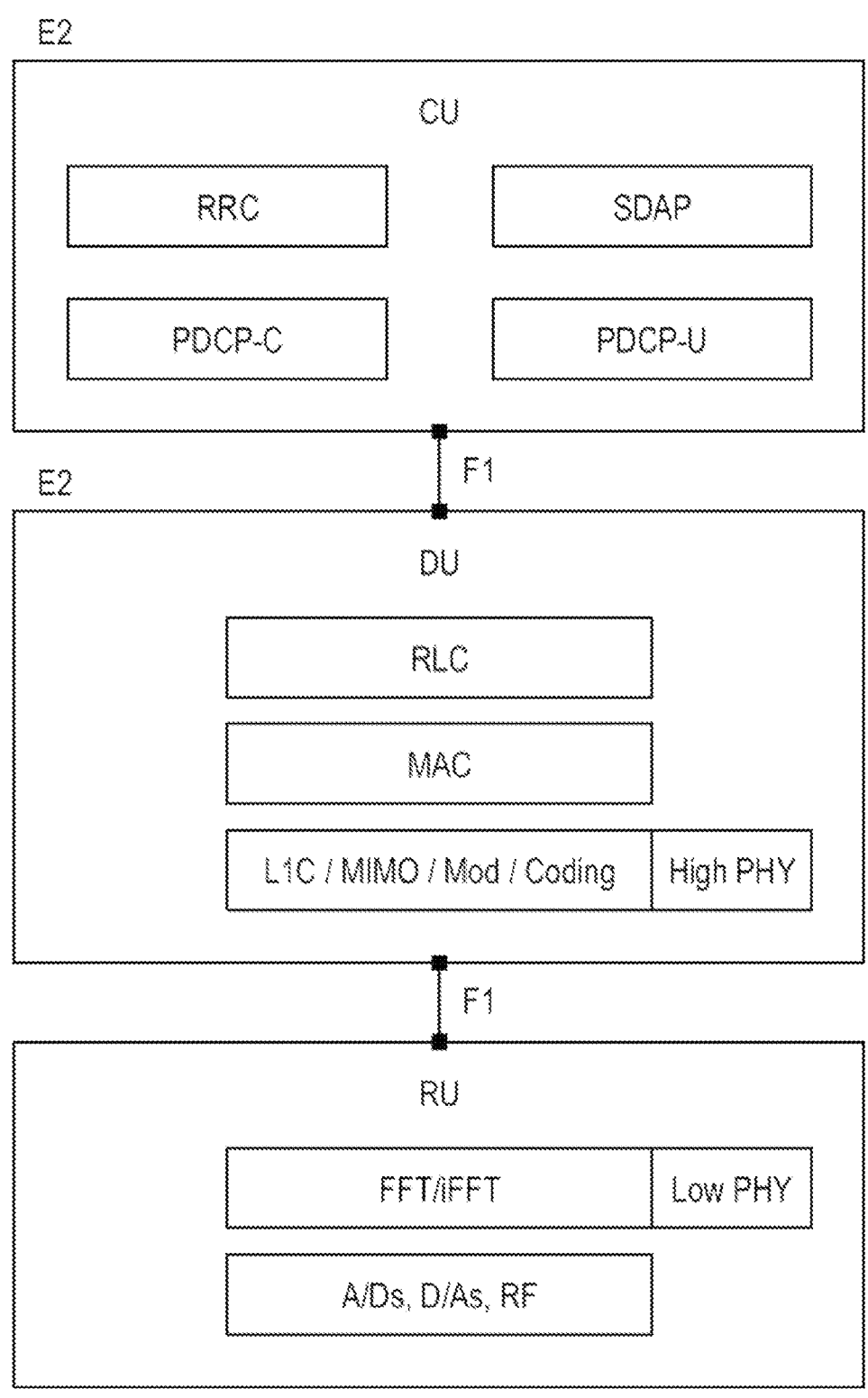
FIG. 7 shows an example of a protocol layer split for the 7-2 split option.

Using the 7-2 split reduces traffic between the DU and RU. O-RAN has specified a version of the 7-2 split. FIG. 7 below illustrates the 7-2 split, as well as how other parts of the protocol stack are split between the CU and the DU. The 7.2x split is the best balance between bringing this technology to market quickly and deployment cost. It reduces confusion about split specifics while making traffic reduction gains and improvements.

Figure 8:
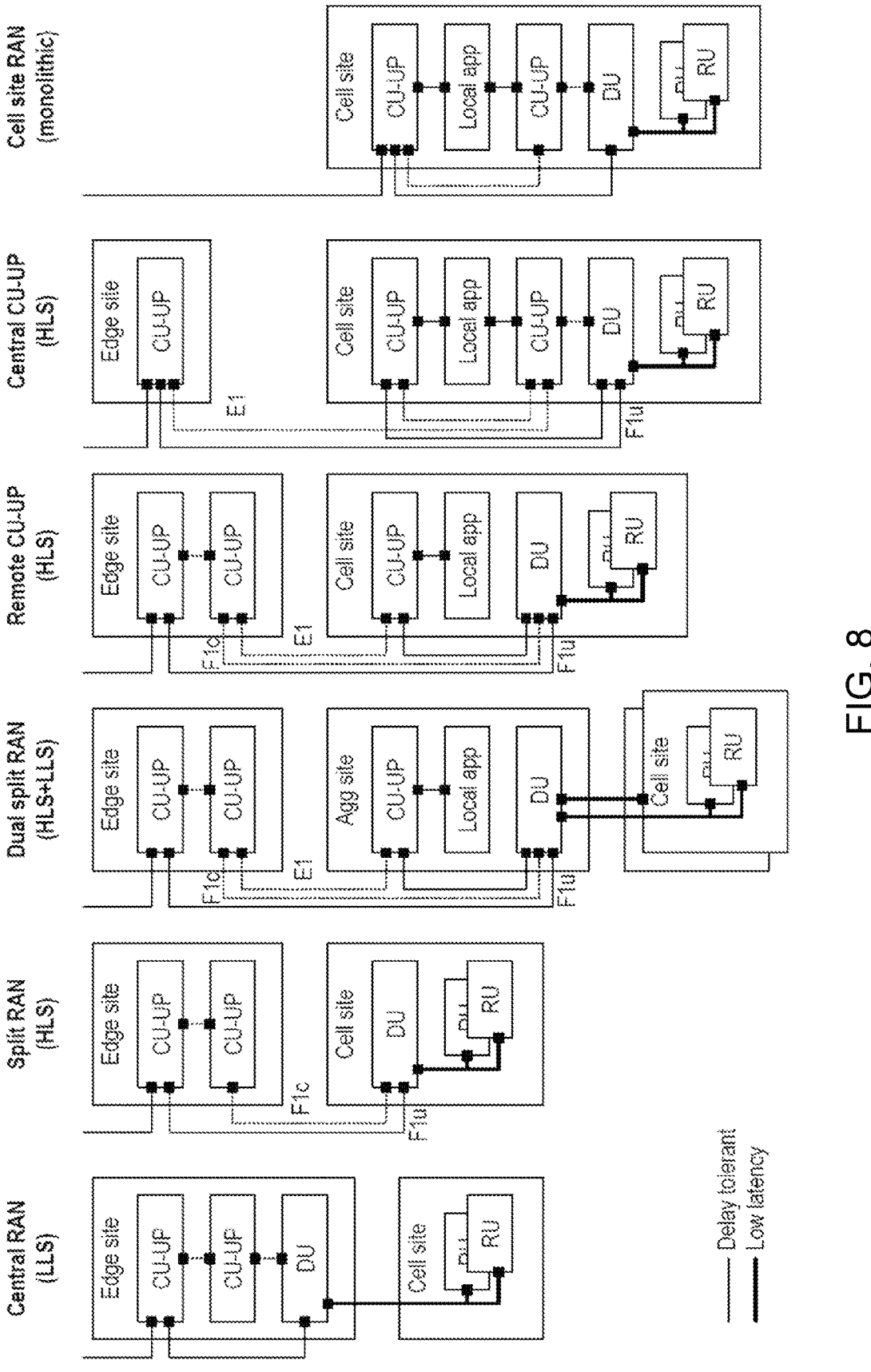
FIG. 8 shows an example of the flexibility of the functional unit locations in the wireless communication system architecture of FIG. 5.

For new 5G RAN architectures (called NR-RAN), the 3GPP has defined and standardized on a new interface, the F1 interface, for communication between the CU and the DU. When the CU and the DU are physically split, it is called a higher-layer split (HLS). While not defined by the 3GPP, the lower-layer interface between the DU and the RU is called a lower-layer split (LLS). The CU and DU are configured in relation to each other and in relation to RUs in several ways. FIG. 8 shows examples of various NR-RAN configurations. Note that the F1 interface is delay-tolerant, while the DU-to-RU interface needs to be low-latency.

Figure 9:
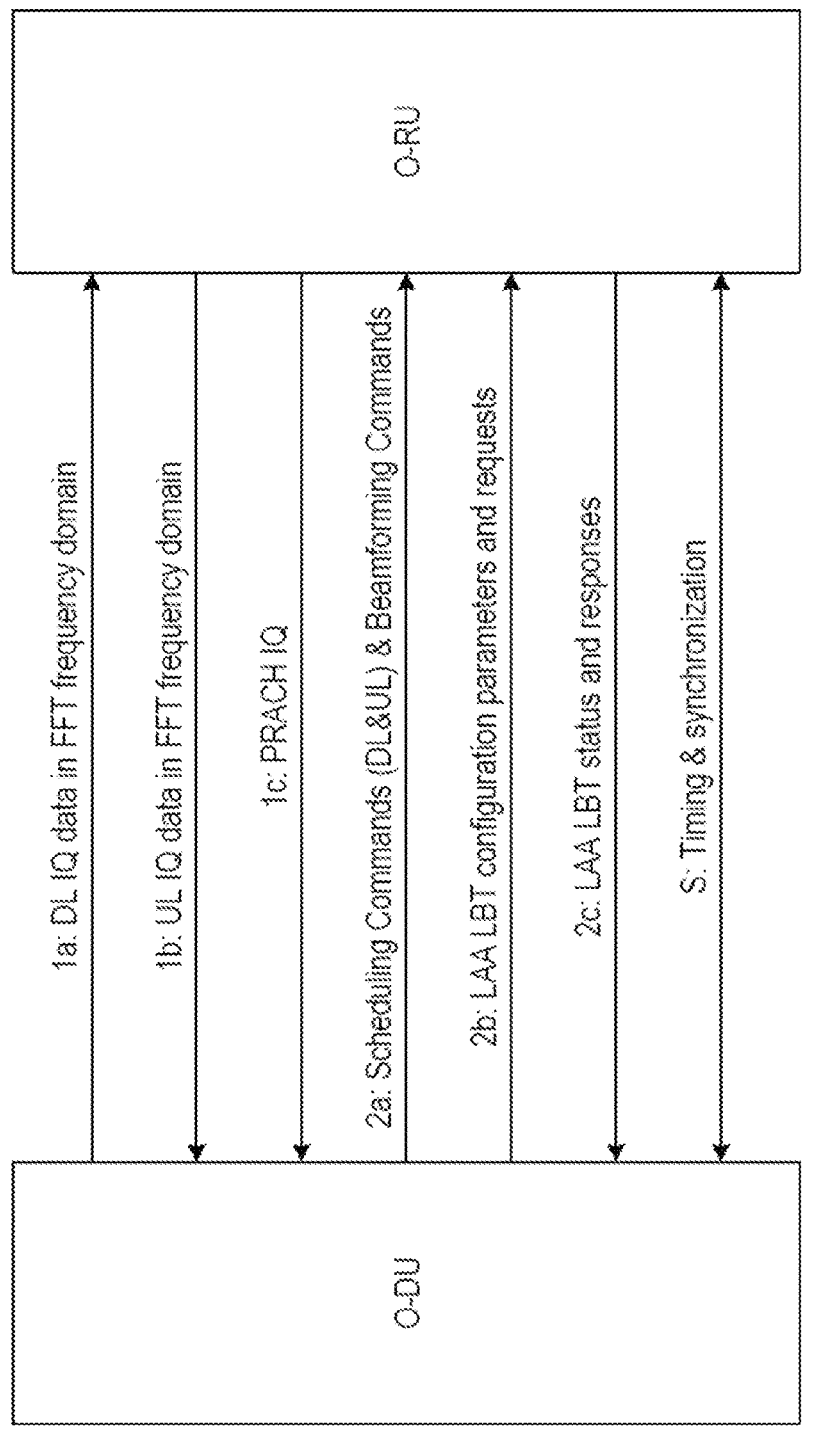
FIG. 9 shows an example of data flows between the distributed unit (DU) and the radio unit (RU) of the wireless communication system architecture of FIG. 5.

The interface between the DU and RU also is known as the fronthaul (FH) interface. The FH interface, one of the most demanding system interfaces, is very latency sensitive. Where the DU and RU come from the same manufacturer, most systems use CPRI or eCPRI (5G only) as the FH interface. FIG. 9 shows an example of how the proposed DU-to-RU interface exchanges information in different planes. While the seven different flows—plus additional management (M)-plane flows—may seem daunting, at a higher level, there are only three data types (IQ data; timing and sync data; and command and control information) across four total planes (control, user, sync, and management).

Compared to CPRI, there are significant differences in how the IQ data is transferred, packed, and unpacked in the FH interface, since CPRI is based on an option 8 split. The option 8 split splits the network at the RF, so the IQ samples have not undergone any PHY processing (FFT/IFFT). As networks evolved in the later stages of 4G and early 5G, eCPRI sought to reduce traffic caused by the increase in antennas and sampling rate (multiple samples per antenna) used in massive multiple-input and multiple-output (MIMO). System traffic overwhelmed the physical connection, and connections that can accommodate the traffic are expensive to implement. To reduce traffic across this interface, eCPRI moves certain parts of the PHY into the RU and adds compression algorithms. Since part of the lower-level PHY functions are in the RU, the DU needs to inform the RU how to perform these functions. This creates a very different command-and-control interface between eCPRI and O-RAN's FH interface as well.

Figure 10:
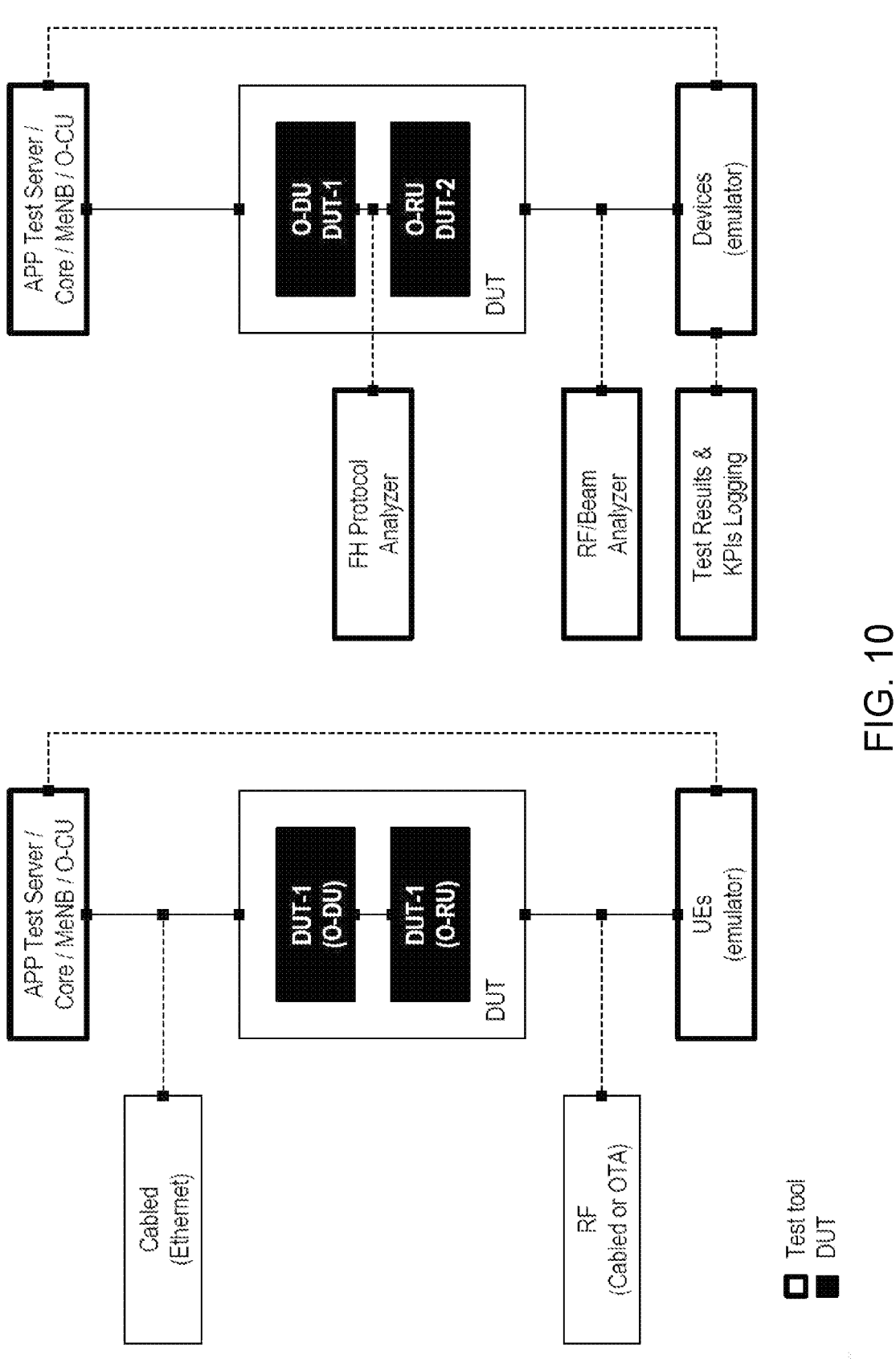
FIG. 10 shows examples of active and passive test setups for the wireless communication system architecture of FIG. 5.

In some embodiments, the DU and RU interfaces can be validated using interoperability testing. FIG. 10 is an example test setup for testing an O-RAN-DU (O-DU) and O-RAN-RU (O-RU) with an O-RAN-CU (O-CU) and a UE, which could be emulated or commercial. There is a test point to look at the interface between the CU and DU, and one to look at the RU RF input/output, but the DU and RU are combined as the device under test (DUT). This leaves the FH interface between the DU and RU untested when using active stimulus and only considered for passive monitoring. In some examples, active testing includes protocol testing (for test-case validation and troubleshooting) and parametric testing (to make sure that each unit performs as expected, i.e., unit tests).

5. Examples Embodiments of the Disclosed Technology

Figure 11:
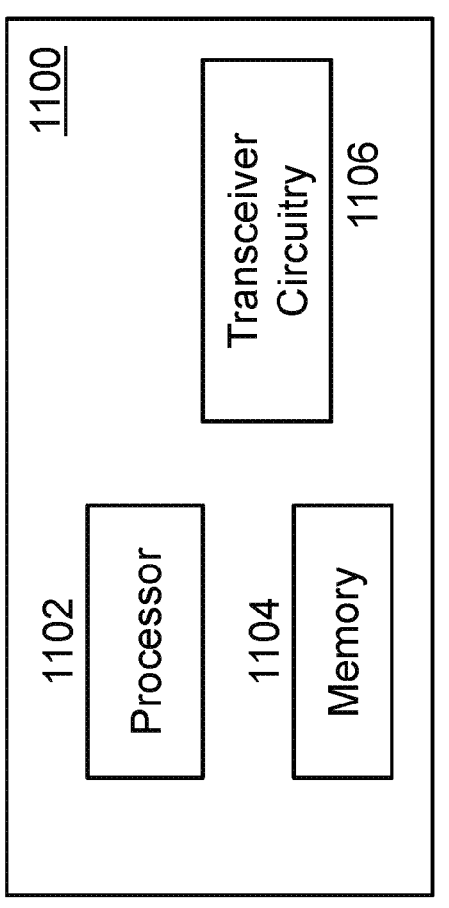
FIG. 11 shows an example of a hardware platform that is used to implement one or more of the disclosed techniques and/or embodiments.

FIG. 11 is a block diagram representation of a wireless hardware platform 1100 which may be used to implement the various methods described in the present document. The hardware platform 1100 may be incorporated within a base station or a user device. The hardware platform 1100 includes a processor 1102, a memory 1104 and a transceiver circuitry 1106. The processor may execute instructions, e.g., by reading from the memory 1104, and control the operation of the transceiver circuitry 1106 and the hardware platform 1100 to perform the methods described herein. In some embodiments, the memory 1104 and/or the transceiver circuitry 1106 may be partially or completely contained within the processor 1102 (e.g., same semiconductor package). The transceiver circuitry 1106 may be configured to be controlled by the processor 1102 to transmit and/or receive various data and control messages disclosed in the present document.

Some preferred embodiments may implement the following solutions.

Figure 12:
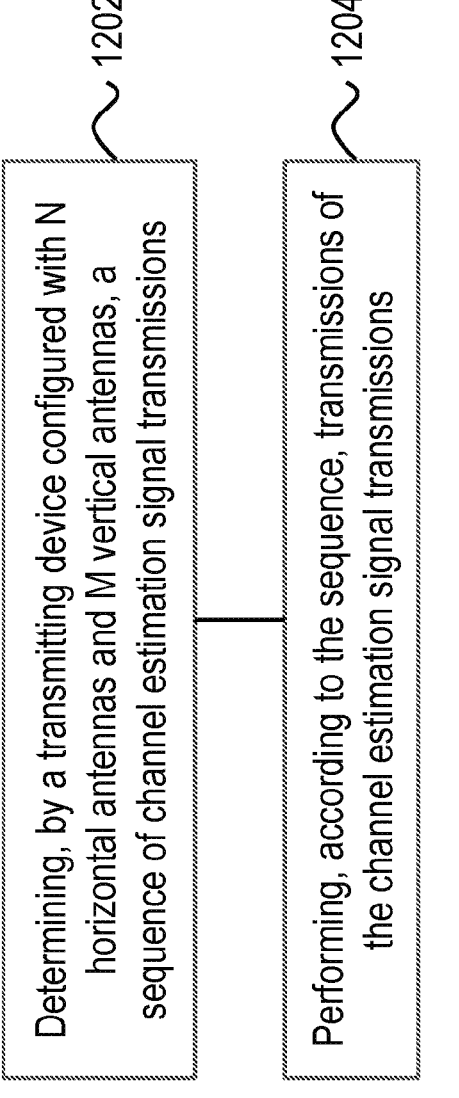
FIG. 12 is a flowchart of an example method of facilitating wireless communication.

1. A method of wireless communication (e.g., method 1200 in FIG. 12) that includes determining (1202), by a transmitting device configured with N horizontal antennas and M vertical antennas, a sequence of channel estimation signal transmissions, and performing (1204), based on the sequence, transmissions of the channel estimation signal transmissions.

2. The method of solution 1, wherein the sequence comprises performing a sweep across the N horizontal antennas followed by repeating sweeps across M vertical antennas.

3. The method of solution 1, wherein the sequence comprises performing a sweep across the M vertical antennas followed by repeating sweeps across N horizontal antennas. In these solutions, typical numbers N and M (which are integers) may be 4, 8 or 16.

4. The method of any of solutions 1 to 3, wherein the sequence is dependent on relative channel variations in a vertical direction or in a horizontal direction. For example, a channel variation in the vertical direction may be causes by ground, an airplane, high rise buildings etc. For example, a channel variation in the horizontal direction may be causes by other objects such as cars, trees and buildings nearby the receiving device.

Another example solution includes reducing amount of channel condition information that is transferred between a DU and a CU by operating an antenna array such that channel estimation reference signals (e.g., SRS) are transmitted from all antenna elements along one dimension (e.g., horizontal or vertical) and a corresponding report for all antennas may be communicated together. The reference signal transmission may be stepped through a step size along the other dimension (e.g., vertical or horizontal), where the step size may depend on an expected movement of receiving devices along the second dimensions. For example, if receiving devices are not expected to have significant vertical movement, step size of 1 row may be used, while if the receiving devices are expected to have a significant movement (above a threshold) a higher step size (e. g, 2 or 4 rows) may be used.

5. A method of wireless communication, comprising: determining, by a transmitting device configured with N horizontal antennas and M vertical antennas, a sequence of channel estimation signal transmissions; and performing, based on the sequence, transmissions of the channel estimation signal transmissions to a receiving device, wherein the sequence is based on relative channel variations in a vertical direction or in a horizontal direction, and wherein the sequence comprises performing: (a) a sweep across the N horizontal antennas followed by repeating sweeps across the M vertical antennas, or (b) a sweep across the M vertical antennas followed by repeating sweeps across the N horizontal antennas.

6. The method of solution 5, wherein the channel estimation signal transmissions comprise a sounding reference signal (SRS) transmission.

7. The method of solution 6, wherein an overhead of the channel estimation signal transmissions is based on a throughput of an uplink on an F1 interface and a throughput of the SRS transmission. In an example, the overhead of the SRS transmissions can be computed for the FDD and TDD frameworks using the equations described in Section 3.

8. The method of solution 5, wherein the transmitting device comprises a distributed unit (DU) and a centralized unit (CU).

9. The method of solution 8, wherein the DU is connected to a cloud using a full-duplex fiber link, and wherein the CU is connected to the cloud using at least a link with an F1 interface. In the example shown in FIG. 4A, the cloud corresponds to a private IP network.

10. The method of solution 5, wherein the channel estimation signal transmissions are transmitted using time-division duplexing (TDD), and wherein a rate of the channel estimation signal transmissions is equal to a rate of data transmissions. In this example, a constraint on the uplink/downlink ratio can also affect the rate of SRS and/or data transmissions.

11. The method of solution 5, wherein the channel estimation signal transmissions are transmitted using frequency-division duplexing (FDD), and wherein the channel estimation signal transmissions are transmitted on every fifth data transmission.

12. A method of wireless communication, comprising: receiving, by a receiving device from a transmitting device, a sequence of channel estimation signal transmissions, wherein the sequence is based on relative channel variations in a vertical direction or in a horizontal direction, and wherein the transmitting device is configured with N horizontal antennas and M vertical antennas; determining, based on the sequence of the channel estimation signal transmissions, channel state information; and transmitting, based on the channel state information, scheduling information to the transmitting device, wherein transmitting device is further configured, as part of transmitting the sequence of channel estimation signal transmissions, to: (a) sweep across the N horizontal antennas followed by repeating sweeps across the M vertical antennas, or (b) sweep across the M vertical antennas followed by repeating sweeps across the N horizontal antennas.

13. The method of solution 12, wherein the channel estimation signal transmissions comprise a sounding reference signal (SRS) transmission.

14. The method of solution 13, wherein an overhead of the channel estimation signal transmissions is based on a throughput of an uplink on an F1 interface and a throughput of the SRS transmission.

15. A method of reducing data communication between a distributed unit (DU) and a centralized unit (CU), comprising: cycling transmission of a reference signal through a first group of elevation layers of an antenna array and collecting a corresponding channel feedback; and progressively sweeping across different elevation layers and collecting the corresponding channel feedback, wherein the antenna array comprises N horizontal antennas and M vertical antennas, wherein progressively sweeping across the different elevation layers is based on relative channel variations in a vertical direction or in a horizontal direction, and comprises: (a) sweeping across (N−1) horizontal antennas followed by repeating sweeps across the M vertical antennas, or (b) sweeping across (M−1) vertical antennas followed by repeating sweeps across the N horizontal antennas.

16. The method of solution 15, wherein, due to the cycling across a plurality of antenna elements in an elevation layer, channel information for multiple antenna elements is reported at a time.

17. The method of solution 15, wherein the antenna array comprises a 4T4R array, a 16T16R array, a 32T32R array, or a 64T64R array.

18. The method of solution 15, wherein the corresponding channel feedback comprises channel state information (CSI), a precoder matrix, or a channel quality indicator (CQI).

19. A wireless communication apparatus comprising a processor and a transceiver, wherein the processor is configured to perform a method recited in any one or more of above solutions.

20. A system comprising a plurality of wireless communication apparatus, each apparatus comprising one or more processors, configured to implement a method recited in any one or more of above solutions.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless communication, comprising:
determining, by a transmitting device configured with N horizontal antennas and M vertical antennas, a sequence of channel estimation signal transmissions, wherein N and M are integers greater than 1; and
performing, based on the sequence, transmissions of the channel estimation signal transmissions to a receiving device,
wherein the sequence is based on relative channel variations in a vertical direction or in a horizontal direction, and
wherein the sequence comprises performing:
(a) a sweep across the N horizontal antennas followed by repeating sweeps across the M vertical antennas, or
(b) a sweep across the M vertical antennas followed by repeating sweeps across the N horizontal antennas.

2. The method of claim 1, wherein the channel estimation signal transmissions comprise a sounding reference signal (SRS) transmission.

3. The method of claim 2, wherein an overhead of the channel estimation signal transmissions is based on a throughput of an uplink on an F1 interface and a throughput of the SRS transmission.

4. The method of claim 1, wherein the transmitting device comprises a distributed unit (DU) and a centralized unit (CU).

5. The method of claim 4, wherein the DU is connected to a cloud using a full-duplex fiber link, and wherein the CU is connected to the cloud using at least a link with an F1 interface.

6. The method of claim 1, wherein the channel estimation signal transmissions are transmitted using time-division duplexing (TDD), and wherein a rate of the channel estimation signal transmissions is equal to a rate of data transmissions.

7. The method of claim 1, wherein the channel estimation signal transmissions are transmitted using frequency-division duplexing (FDD), and wherein the channel estimation signal transmissions are transmitted on every fifth data transmission.

8. A method of reducing data communication between a distributed unit (DU) and a centralized unit (CU), comprising:
cycling transmission of a reference signal through a first group of elevation layers of an antenna array and collecting a corresponding channel feedback; and
progressively sweeping across different elevation layers and collecting the corresponding channel feedback,
wherein the antenna array comprises N horizontal antennas and M vertical antennas, wherein N and M are integers greater than 1, and
wherein progressively sweeping across the different elevation layers is based on relative channel variations in a vertical direction or in a horizontal direction, and comprises:
(a) sweeping across (N−1) horizontal antennas followed by repeating sweeps across the M vertical antennas, or
(b) sweeping across (M−1) vertical antennas followed by repeating sweeps across the N horizontal antennas.

9. The method of claim 8, wherein, due to the cycling across a plurality of antenna elements in an elevation layer, channel information for multiple antenna elements is reported at a time.

10. The method of claim 8, wherein the antenna array comprises a 4 transmit and 4 receive (4T4R) array, a 16 transmit and 16 receive (16T16R) array, a 32 transmit and 32 receive (32T32R) array, or a 64 transmit and 64 receive (64T64R) array.

11. The method of claim 8, wherein the corresponding channel feedback comprises channel state information (CSI), a precoder matrix, or a channel quality indicator (CQI).

12. A transmitting device for wireless communication configured with N horizontal antennas and M vertical antennas, comprising:
at least one processor configured to cause the transmitting device to implement a method comprising:
determining a sequence of channel estimation signal transmissions; and performing, based on the sequence, transmissions of the channel estimation signal transmissions to a receiving device, wherein N and M are integers greater than 1, wherein the sequence is based on relative channel variations in a vertical direction or in a horizontal direction, and wherein the sequence comprises performing:

(a) a sweep across the N horizontal antennas followed by repeating sweeps across the M vertical antennas, or (b) a sweep across the M vertical antennas followed by repeating sweeps across the N horizontal antennas.

13. The transmitting device of claim 12, wherein the channel estimation signal transmissions comprise a sounding reference signal (SRS) transmission.

14. The transmitting device of claim 13, wherein an overhead of the channel estimation signal transmissions is based on a throughput of an uplink on an F1 interface and a throughput of the SRS transmission.

15. The transmitting device of claim 12, wherein the transmitting device comprises a distributed unit (DU) and a centralized unit (CU).

16. The transmitting device of claim 15, wherein the DU is connected to a cloud using a full-duplex fiber link, and wherein the CU is connected to the cloud using at least a link with an F1 interface.

17. The transmitting device of claim 12, wherein the channel estimation signal transmissions are transmitted using time-division duplexing (TDD), and wherein a rate of the channel estimation signal transmissions is equal to a rate of data transmissions.

18. The transmitting device of claim 12, wherein the channel estimation signal transmissions are transmitted using frequency-division duplexing (FDD), and wherein the channel estimation signal transmissions are transmitted on every fifth data transmission.

*   *   *   *   *